United States Patent [19]

Carrie et al.

[11] Patent Number: 5,672,578
[45] Date of Patent: Sep. 30, 1997

[54] LIMESCALE REMOVING COMPOSITIONS

[75] Inventors: Michel Jean Carrie, Cincinnati, Ohio; Eddy Vos, Linden, Belgium

[73] Assignee: The Procter & Gamble Company, Cincinnati, Ohio

[21] Appl. No.: 687,415

[22] PCT Filed: Feb. 1, 1995

[86] PCT No.: PCT/US95/01371

§ 371 Date: Aug. 2, 1996

§ 102(e) Date: Aug. 2, 1996

[87] PCT Pub. No.: WO95/21232

PCT Pub. Date: Aug. 10, 1995

[30] Foreign Application Priority Data

Feb. 3, 1994 [EP] European Pat. Off. ............. 94870019

[51] Int. Cl.$^6$ ................. C11D 1/62; C11D 1/66; C11D 1/68; C11D 3/22

[52] U.S. Cl. ................. 510/245; 510/191; 510/218; 510/219; 510/234; 510/235; 510/238; 510/239; 510/240; 510/241; 510/242; 510/243; 510/244; 510/246; 510/247; 510/253; 510/254; 510/269; 510/274

[58] Field of Search .............. 510/191, 218, 510/219, 234, 235, 238, 239, 240, 241, 242, 243, 244, 245, 246, 247, 253, 254, 269, 274

[56] References Cited

U.S. PATENT DOCUMENTS

| 3,277,008 | 10/1966 | Heit | 510/253 |
| 5,008,030 | 4/1991 | Cook et al. | 510/384 |
| 5,192,460 | 3/1993 | Thomas et al. | 510/238 |

FOREIGN PATENT DOCUMENTS

WO94/13769  6/1994  WIPO.

*Primary Examiner*—Alan Diamond
*Attorney, Agent, or Firm*—Robert B. Aylor; T. David Reed

[57] ABSTRACT

Limescale removing compositions contain a low level of surfactant, i.e., less than about 1% and maleic acid and have a pH of from about 0.1 to about 4.5. The surfactant can be anionic, nonionic, amphoteric, or cationic, but is preferably cationic. The composition can be used neat, or diluted, by applying it to the surface to be treated, leaving it to react, and then rinsing.

12 Claims, 1 Drawing Sheet

LIMESCALE REMOVING COMPOSITIONS

This application is a 371 of PCT/U.S. Ser. No. 95/01371 filed Feb. 1, 1995.

TECHNICAL FIELD

The present invention relates to cleaning compositions for hard-surfaces. More specifically, compositions are described which give optimal performance in removing limescale stains and encrustations containing a very high proportion of mineral deposits but little organic material, as typically found in appliances.

BACKGROUND

When using ordinary water, as compared to demineralized water, in appliances such as kettles, flatwares, coffee machines, steam irons and the like, scale tends to form on the internal surfaces, especially on the metal surfaces, of said appliances which are in contact with said water. Indeed, ordinary water such as tap water contains a certain amount of solubilized ions which upon water evaporation deposit as salts such as calcium carbonate on surfaces which are often in contact with said water. This limescale formation and deposition phenomenon is even more troublesome in places where water is particularly hard. Furthermore, this deposition phenomenon is also accelerated by high temperatures as typically found in electrical appliances such as coffee machines, kettles and the like. Additionally, after a certain period of time such limescale deposits can obstruct the water pipes which can be found in appliances and impair thereby proper functioning of said appliances, shorten their lifetime and render them unusable.

The particularity of the limescale deposits in appliances is that said deposits are composed mostly of mineral deposits, typically of calcium carbonate together with a minimum amount of organic material such as protein and/or greasy material. Indeed, we have observed that kettle scales, for instance, contain from 85% to 95% by weight of calcium carbonate whereas kitchen scales contain 50% to 60% by weight of calcium carbonate and bathtub scales contain 65% to 75% by weight. In other words, the limescale deposits in appliances are very different from bathroom-type stains and kitchen-type stains which contain lower proportions of calcium carbonate together with higher proportions of organic material such as calcium stearate, soap scum and/or greasy material.

Accordingly, it is an object of the present invention to provide a composition for the removal of limescale deposits composed mostly of mineral deposits, typically of calcium carbonate, said composition possessing a superior limescale removing capacity while being also safe to the surface cleaned.

More particularly, it is a further object of the present invention to provide a composition particularly adapted to descale the hard-surfaces of appliances which are in contact with water thereby avoiding that limescale deposits impair proper functioning of said appliances and eventually render them unusable.

It has now been found that compositions comprising maleic acid and a surfactant or mixtures thereof, in appropriate amounts below 1% by weight of the total composition, are very effective in removing limescale deposits such as those found on the surfaces of scaled appliances while being also safe to said surfaces. Indeed, it has been found that the compositions of the present invention comprising maleic acid and a surfactant or mixtures thereof, in appropriate amounts below 1% by weight of the total composition, are significantly more effective in removing limescale deposits containing a very high proportion of calcium carbonate together with a minimum amount of organic material, than the same compositions comprising an amount of 1% by weight or more of said surfactant.

An advantage of the low levels of surfactants of the compositions according to the present invention is that the generation of suds is minimal, and thus facilitates the rinse operations. Indeed, the compositions of the present invention allow to be rinsed off quickly and thoroughly. This makes the compositions of the present invention particularly suitable for descaling appliances where the water is heated such as coffee machines, i.e. where high temperatures favor the formation of suds during the descaling operation.

U.S. Pat. No. 3,277,008 discloses solid compositions suitable for use with water to form aqueous solutions for descaling the internal metal surfaces of the jacket of the glass-lined jacketed equipment. Said compositions comprise a cleaning agent such as sulfamic or hydrochloric acid, maleic acid and a corrosion inhibitor. Surfactants are not disclosed.

DE-3 822 658 discloses compositions useful for removing oxide layers from metal surfaces like copper or bronze. Said compositions comprise a mineral acid for example nitric acid, a carboxylic acid such as maleic acid, phosphonic acid and thioureas. Nonionic surfactants are disclosed as optional ingredients without specifying appropriate levels.

EP-A-0 496 188 discloses a composition comprising 1% or more of nonionic surfactants together with maleic acid whereby good limescale removal is provided. These compositions are particularly effective to tackle stains which contain not only calcium carbonate but also a high proportion of organic material such as soap scum and/or grease. Such stains are found in the bathrooms and the kitchens.

SUMMARY OF THE INVENTION

The present invention is an aqueous composition for descaling appliances having a pH of from 0.1 to 4.5 comprising maleic acid and a surfactant or mixtures thereof. Said composition comprises said surfactant in an amount below 1% by weight of the total composition, such that the limescale removing performance is improved, compared to said composition if it comprised 1% of said surfactant.

The present invention also encompasses a process of removing limescale deposits in appliances wherein a composition according to the present invention is used in its neat or diluted form.

DETAILED DESCRIPTION OF THE INVENTION

Figure 1:
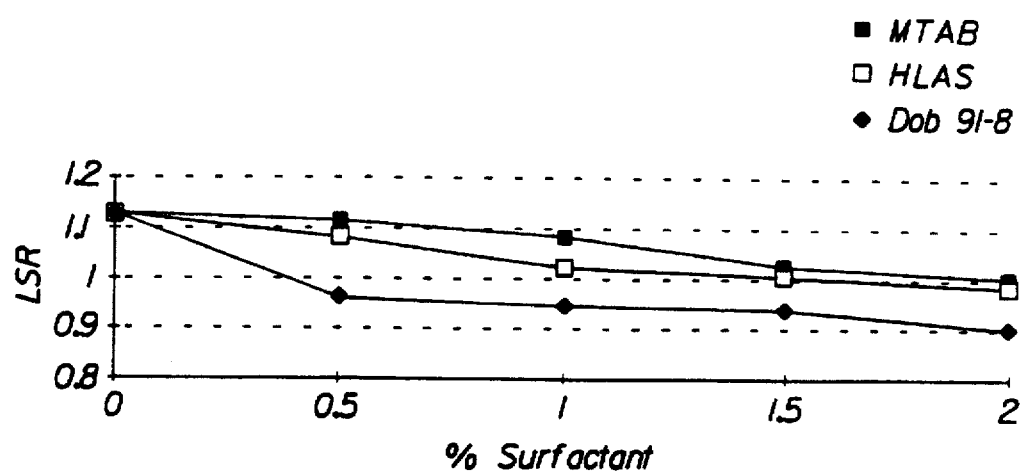
FIG. 1 summarizes the data obtained in the experiment described in the Experimental data section 1.1) at the top of page 13, which shows lime scale removal (LSR) as a function of surfactant concentration when only limescale is present.

The compositions according to the present invention are designed for removing limescale deposits composed mostly of mineral deposits, typically of calcium carbonate together with a minimun amount of organic material. Thus they comprise as a first essential ingredient an organic acid such as maleic acid. The compositions according to the present invention comprise from 0.1% to 45% by weight of the total composition of maleic acid, preferably from 1% to 25% and more preferably from 8% to 20%. This percentage is calculated on the basis of the molecular weight of the acid form, but maleic anhydride is equally convenient for use in the compositions according to the present invention. Indeed maleic anhydride is generally cheaper and it is transformed into the acid form when incorporated in an aqueous medium. Other acids may be used in addition to maleic acid, such as for example sulfonic acids, hydrochloric acid, nitric acid, phosphoric acid, citric acid or mixtures thereof. It is preferred herein to use maleic acid either alone or together with sulfonic acids such as sulfamic acid, methanesulfonic acid or mixtures thereof, and/or citric acid.

The compositions according to the present invention comprise as a second essential ingredient a surfactant or mixtures thereof. The compositions according to the present invention comprise said surfactant in an appropriate amount below 1% by weight of the total composition. The presence of surfactants in the compositions of the present invention, even at these low levels, allows to ensure complete wetting of the soils, helping thereby the acids to act. Furthermore, the presence of surfactants in the compositions of the present invention is also needed as the limescale deposits found in appliances although composed essentially of mineral deposits also contain a minimum amount of organic material. Thus, the presence of surfactants helps to solubilize soil ingredients, in particular organic residues, and helps to prevent their redeposition on surfaces. The appropriate amount of surfactants is dependent on the specific surfactant used and thus is different for each surfactant or each mixture thereof. According to the present invention the amount of surfactant in the composition is such that the limescale removing performance is improved, compared to said composition if it comprised 1% of said surfactant.

By "limescale removing performance improvement" it is to be understood that the compositions of the present invention are more effective in removing limescale deposits composed mostly of calcium carbonate together with a minimum amount of organic material such as those found in scaled appliances, than the same compositions comprising 1% by weight of said surfactant. More specifically, we have observed that by plotting the limescale removing capacity (LSR) tested on a marble block which contains essentially calcium carbonate, against the increase of percentage of a given surfactant in a composition comprising maleic acid, the less surfactant the better the limescale removing capacity is obtained. However, in practice the limescale deposits in appliances contain a minimun amount of organic material, thus it is desirable to add some surfactants. Indeed, we have observed that by plotting the limescale removing capacity (LSR) tested on a marble block covered by a greasy soil model, against the increase of percentage of a given surfactant in a composition comprising maleic acid, a peak is obtained. The peak is dependent on the surfactant used. In other words, the measured limescale removing capacity for any composition comprising a given surfactant in appropriate amount below 1% by weight of the total composition is higher than the one obtained with a composition comprising 1% by weight of said given surfactant. Accordingly for a given surfactant any composition which fullfils the precedent requirement is in accordance with the present invention.

Furthermore, such low levels of surfactants, in appropriate amounts below 1% by weight of the total composition, also allow to minimize the generation of suds compared to similar compositions comprising higher amounts of said surfactants, thus rendering the rinsing operations easier.

All type of surfactants may be used in the present invention including nonionic, anionic, cationic, zwitterionic or amphoteric surfactants. It is also possible to use mixtures of a type of surfactants or of different types of such surfactants without departing from the spirit of the present invention.

Suitable nonionic surfactants to be used herein are alkoxylated alcohol nonionic surfactants which can be readily made by condensation processes which are well known in the art. However, a great variety of such alkoxylated alcohols, especially ethoxylated and/or propoxylated alcohols is also conveniently commercially available. Surfactants catalogs are available which list a number of surfactants, including nonionics.

Accordingly, preferred alkoxylated alcohols for use herein are nonionic surfactants according to the formula RO(E)e(P)pH where R is a hydrocarbon chain of from 2 to 24 carbon atoms, E is ethylene oxide and P is propylene oxide, and e and p which represent the average degree of, respectively ethoxylation and propoxylation, are of from 0 to 24. The hydrophobic moiety of the nonionic compound can be a primary or secondary, straight or branched alcohol having from 8 to 24 carbon atoms. Preferred nonionic surfactants for use in the compositions according to the invention are the condensation products of ethylene oxide with alcohols having a straight alkyl chain, having from 6 to 22 carbon atoms, wherein the degree of ethoxylation is from 1 to 15, preferably from 5 to 12. Such suitable nonionic surfactants are commercially available from Shell, for instance, under the trade name DOBANOL® or from BASF under the trade name LUTENSOL®. These nonionics are preferred because they have been found to allow the formulation of a stable product without requiring the addition of stabilizers or hydrotopes. When using other nonionics, it may be necessary to add hydrotopes such as cumene sulphonate or solvents such as butyldiglycolether.

Suitable cationic surfactants to be used herein include derivatives of quaternary ammonium, phosphonium, imidazolium and sulfonium compounds. Preferred cationic surfactants for use herein are according to the formula $R_1R_2R_3R_4N^+ X^-$, wherein X is a counteranion, $R_1$ is a $C_8-C_{20}$ hydrocarbon chain and $R_2$, $R_3$ and $R_4$ are independently selected from H or $C_1-C_4$ hydrocarbon chains. In a preferred embodiment of the present invention, $R_1$ is a $C_{12}-C_{18}$ hydrocarbon chain, most preferably $C_{14}$, $C_{16}$ or $C_{18}$, and $R_2$, $R_3$ and $R_4$ are all three methyl, and X is halogen, preferably bromide or chloride, most preferably bromide. Examples of cationic surfactants are stearyl trimethyl ammonium bromide (STAB), cetyl trimethyl ammonium bromide (CTAB) and myristyl trimethyl ammonium bromide (MTAB).

Suitable zwitterionic surfactants contain both cationic and anionic hydrophilic groups on the same molecule at a relatively wide range of pH's. The typical cationic group is a quaternary ammonium group, although other positively charged groups like phosphonium, imidazolium and sulfonium groups can be used. The typical anionic hydrophilic groups are carboxylates and sulfonates, although other groups like sulfates, phosphonates, and the like can be used. A generic formula for some preferred zwitterionic surfactants is

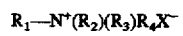

wherein $R_1$ is a hydrophobic group; $R_2$ and $R_3$ are each $C_1$–$C_4$ alkyl, hydroxy alkyl or other substituted alkyl group which can also be joined to form ring structures with the N; $R_4$ is a moiety joining the cationic nitrogen atom to the hydrophilic group and is typically an alkylene, hydroxy alkylene, or polyalkoxy group containing from 1 to 4 carbon atoms; and X is the hydrophilic group which is preferably a carboxylate or sulfonate group. Preferred hydrophobic groups $R_1$ are alkyl groups containing from 8 to 22, preferably less than 18, more preferably less than 16 carbon atoms. The hydrophobic group can contain unsaturation and/or substituents and/or linking groups such as aryl groups, amido groups, ester groups and the like. In general, the simple alkyl groups are preferred for cost and stability reasons.

Other specific zwitterionic surfactants have the generic formulas:

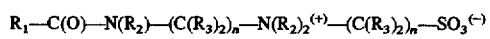

or

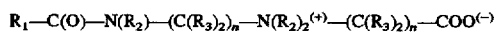

wherein each $R_1$ is a hydrocarbon, e.g. an alkyl group containing from 8 up to 20, preferably up to 18, more preferably up to 16 carbon atoms, each $R_2$ is either a hydrogen (when attached to the amido nitorgen), short chain alkyl or substituted alkyl containing from one to 4 carbon atoms, preferably groups selected from the group consisting of methyl, ethyl, propyl, hydroxy substituted ethyl or propyl and mixtures thereof, preferably methyl, each $R_3$ is selected from the group consisting of hydrogen and hydroxy groups and each n is a number from 1 to 4, preferably from 2 to 3, more preferably 3, with no more than one hydroxy group in any $(C(R_3)_2)$ moiety. The $R_1$ groups can be branched and/or unsaturated. The $R_2$ groups can also be connected to form ring structures. A surfactant of this type is a $C_{10}$–$C_{14}$ fatty acylamidopropylene(hydroxypropylene)sulfobetaine that is available from the Sherex Company under the trade name VARION CAS SULFOBETAINE INC®.

Suitable amphoteric surfactants are surfactants which are similar to the zwitterionic surfactants but without the quaternary group. Indeed, they contain an amine group instead of the quaternary group. Actually, they contain an amine group that is protonated at the low pH of the composition to form cationic group and they may also possess an anionic group at these pHs.

Suitable anionic surfactants for use herein are according to the formula $R_1SO_3M$ wherein $R_1$ represents a hydrocarbon group selected from the group consisting of straight or branched alkyl radicals containing from 6 to 24 carbon atoms and alkyl phenyl radicals containing from 6 to 15 carbon atoms in the alkyl group. M is a salt forming cation which typically is selected from the group consisting of sodium, potassium, ammonium, and mixtures thereof.

Other suitable anionic surfactants can be represented by the water-soluble salts of an alkyl sulfate or an alkyl polyethoxylate ether sulfate wherein the alkyl group contains from 6 to 24 carbon atoms, and preferably from 1 to 30 ethoxy groups for the alkyl polyethoxylate ether sulfates or an alkyl benzene sulfonate in which the alkyl group contains from 9 to 15 carbon atoms, in straight chain or branched chain configuration. An example of alkyl benzene sulfonates is the sodium salt of linear $C_{10}$–$C_{14}$ alkyl benzene sulfonate.

The compositions according to the present invention have a pH of from 0.1 to 4.5, preferably of from 0.1 to 3 and more preferably of from 0.5 to 2.

The compositions according to the present invention are aqueous. Accordingly, the compositions according to the present invention comprise from 10% to 95% by weight of the total composition of water, preferably from 50% to 90%, most preferably from 70% to 85%.

The compositions according to the present invention may further comprise a variety of other ingredients including perfumes, bleaches, colorants, bactericide, thickeners, dyes, chelants, pigments, solvents, stabilizers, corrosion inhibitors and the like.

Compositions according to the present invention are particularly suitable for descaling the material used in appliances such as metal-surfaces, e.g. aluminum, stainless steel, chromed steel, or even synthetic surfaces.

The present invention further encompasses a process of removing limescale deposits from the hard-surfaces, especially from the metal surfaces, of appliances wherein a composition as hereinbefore defined is applied in its neat form or in its diluted form onto said surfaces, then left to act onto said surfaces and then removed by rinsing. The expression "in its diluted form" herein includes dilution by the user of a composition according to the present invention in water. Typical dilution levels are of from 0.5% to 50% of said composition.

The compositions herein are also particularly suitable to be used in cold or hot conditions. For example, when descaling a coffee machine said compositions can be used in neat or diluted form and in hot conditions (80° C. to 180° C.).

The present invention is further illustrated by the following experimental data and examples.

EXPERIMENTAL DATA

1)

The limescale removing capacity of compositions comprising 14% of maleic acid together with increasing percentages of a surfactant, is evaluated by the following limescale removing test method.

The limescale removing (LSR) capacities of different compositions were measured by soaking a marble block of standardized size in these compositions during 30 minutes. Marble blocks are chemically speaking very similar to limescale, i.e. they contain essentially calcium carbonate. Each marble block is weighted before and after the experiment and the performance is expressed in grams of marble block "dissolved" during the 30 minutes. This limescale removing test method is carried out both on an uncovered marble block and on a covered marble block.

1.1) Uncovered marble block

This experiment was conducted for compositions comprising 14% by weight of maleic acid and increasing concentration of a surfactant, either myristyl trimethyl ammonium bromide (a cationic surfactant) or a linear $C_{10}$–$C_{14}$ alkyl benzene sulfonate (an anionic surfactant) or DOBANOL 91-8 (a nonionic surfactant) by using a marble block per se.

As a result, the different curves in FIG. 1 were obtained reporting the limescale removing capacity (LSR) against the increase of the percentage of each surfactant by weight of the total composition of a composition comprising 14% of maleic acid.

The curves in FIG. 1 show that the limescale removing capacity of compositions comprising maleic acid is better when said compositions comprise a surfactant at a level below 1% by weight of the total composition compared to compositions comprising at least 1% of said surfactant.

1.2) Covered marble block

This experiment was conducted for compositions comprising 14% by weight of maleic acid and increasing concentration of a surfactant, either cetyl trimethyl ammonium bromide (a cationic surfactant) or a linear $C_{10}$–$C_{14}$ alkyl benzene sulfonate (an anionic surfactant) by using a marble block covered by a greasy soil model. The amount of greasy soil on the marble block was about 0.85% by weight.

Figure 2:
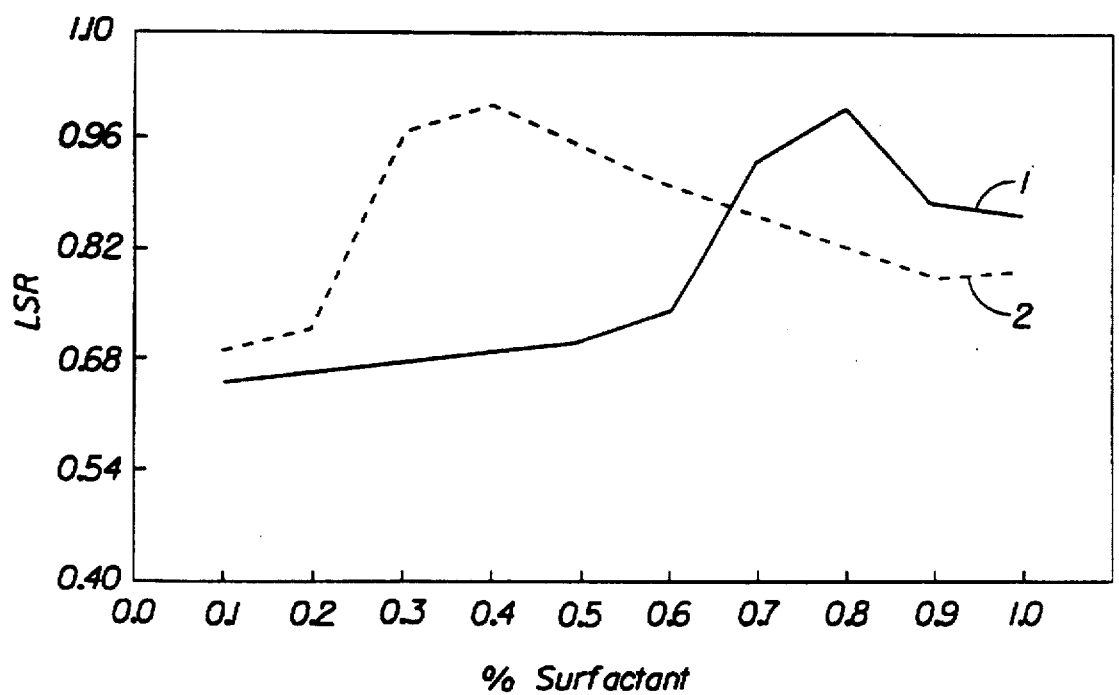
FIG. 2 summarizes the data obtained in the experiment described in the Experimental data section 1.2) at the bottom of page 13, which shows lime scale removal (LSR) as a function of surfactant concentration When limescale and oily soil are both present.

As a result curve 1 in FIG. 2 was obtained reporting the limescale removing capacity (LSR) against the increase of the percentage of cetyl trimethyl ammonium bromide by weight of the total composition of a composition comprising 14% of maleic acid. Curve 2 in FIG. 2 was obtained reporting the limescale removing capacity (LSR) against the increase of the percentage of a linear $C_{10}$–$C_{14}$ alkyl benzene sulfonate by weight of the total composition of a composition comprising 14% of maleic acid.

The curves in FIG. 2 show that a peak is obtained for each surfactant tested. Indeed, these curves show that acidic compositions comprising a surfactant in an appropriate amount below 1% by weight of the total composition, exhibit improved limescale performance as compared to the same compositions comprising at least 1% by weight of said given surfactant.

2)

Further examples of compositions according to the present invention are the following. These compositions are made comprising the listed ingredients in the listed proportions (weight %).

| Ingredients: | Compositions | | | | |
|---|---|---|---|---|---|
| (% by weight) | 1 | 2 | 3 | 4 | 5 |
| Maleic acid | 14 | 14 | 16 | 14 | 14 |
| Citric acid | / | / | 3 | / | / |
| LUTENSOL AO7* | 0.5 | / | / | / | / |
| Stearyl trimethyl ammonium bromide*** | / | 0.1 | / | / | / |
| Myristyl trimethyl ammonium bromide** | / | / | 0.6 | / | / |
| Cetyl trimethyl ammonium bromide**** | / | / | / | 0.8 | / |
| Linear $C_{10}$–$C_{14}$ alkyl benzene sulfonate | / | / | / | / | 0.4 |
| Waters & Minors | | | up to 100 | | |

*Lutensol AO7 is a nonionic surfactant.
**Stearyl trimethyl ammonium bromide is a cationic surfactant.
***Myristil trimethyl ammonium bromide is a cationic surfactant.
****Cetyl trimethyl ammonium bromide is a cationic surfactant.

All the compositions according to the examples above exhibit superior limescale performance while being safe to the surfaces cleaned.

What is claimed is:

1. An aqueous composition suitable for descaling appliances having a pH of from about 0.1 to about 4.5, comprising maleic acid and a surfactant or mixture of surfactants of the formula $$R_1R_2R_3R_4N^+ \, X^-,$$

wherein $X^-$ is a counteranion, $R_1$ is a $C_8$–$C_{20}$ hydrocarbon chain and $R_2$, $R_3$ and $R_4$ are independently selected from H or $C_1$–$C_4$ hydrocarbon chains.

2. A composition according to claim 1 wherein the surfactant or mixture of surfactants is selected from the group of stearyl trimethyl ammonium bromide, cetyl trimethyl ammonium bromide, myristyl trimethyl ammonium bromide or mixtures thereof.

3. A composition according to claim 1 comprising from about 0.1% to about 45% by weight of the total composition of maleic acid.

4. A composition according to claim 3 comprising from about 1% to about 25% by weight of the total composition of maleic acid.

5. A composition according to claim 3 comprising from about 8% to about 20% by weight of the total composition of maleic acid.

6. A composition according to claim 1 wherein the pH is from about 0.1 to about 3.

7. A composition according to claim 1 wherein the pH is from about 0.5 to about 2.

8. A composition according to claim 1 wherein said composition further comprises sulfonic acid, methanesulfonic acid, citric acid or mixtures thereof.

9. A process of removing limescale deposits from hard-surfaces, of appliances comprising the steps of applying the composition according to claim 1 in its neat or diluted form onto said surfaces, under cold or hot conditions, then leaving said composition on said surfaces to act and then removing said composition by rinsing.

10. A process of removing limescale deposits from hard-surfaces, of appliances comprising the steps of applying the composition according to claim 2 in its neat or diluted form onto said surfaces, under cold or hot conditions, then leaving said composition on said surfaces to act and then removing said composition by rinsing.

11. A process according to claim 9 wherein the hard-surfaces are metal surfaces.

12. A process according to claim 10 wherein the hard-surfaces are metal surfaces.

* * * * *